United States Patent [19]

Ito

[11] 4,099,367
[45] Jul. 11, 1978

[54] FRUIT PLUCKING DEVICE

[76] Inventor: Yoshikane Ito, No. 238 Kawai, Koyataira-son, Mima-gun Tokushima-ken, Japan

[21] Appl. No.: 696,839

[22] Filed: Jun. 17, 1976

[51] Int. Cl.² ............................................ A01D 46/24
[52] U.S. Cl. ...................................................... 56/336
[58] Field of Search .................................. 56/332–340, 56/328 R, 331

[56] References Cited

U.S. PATENT DOCUMENTS

| 853,313 | 5/1907 | Myers | 56/333 |
|---|---|---|---|
| 3,701,242 | 10/1972 | Townsend | 56/328 R |

Primary Examiner—Russell R. Kinsey
Attorney, Agent, or Firm—Wenderoth, Lind & Ponack

[57] ABSTRACT

A fruit plucking device which has a pair of scissors with a stationary member and movable member each provided on its top portion with a cutting edge to cut fruit stems therebetween. A holding means is connected to the rear of the scissors and is adapted to enclose the fruit plucked to prevent the fruit from falling to the ground when plucked. Also, a conveying means is connected to the rear end of the holding means for storing and/or conveying the plucked fruits. By this structure fruit can be effectively plucked by using only one hand.

13 Claims, 4 Drawing Figures

FRUIT PLUCKING DEVICE

BACKGROUND OF THE INVENTION

The present invention relates to a fruit plucking device for gathering fruits such as oranges, apples, pears, Japanese persimmons, and particularly to a fruit plucking device which has a pair of scissors for cutting away the fruit from the tree, a holding means for receiving the fruit after it is cut by the scissors, and a conveying means.

The conventional means for most effectively plucking fruit is a pair of scissors. To pluck the fruit with a pair of scissors, the plucking person grasps the fruit in his left hand, for example, and cuts the branch supporting the fruit with the scissors held in his right hand. It is necessary for him to use both of his hands. When a tree is tall, the plucking person has to climb the tree to pluck the fruits. In such a case, it is necessary for the plucking person to hold on to the tree with at least one hand to prevent himself from falling down. Therefore, the plucking person can freely use only one of his hands; he must then pluck the fruits with one hand and use the other hand holding on to the tree for grasping the scissors or the fruit. This results in the decrease in the efficiency of plucking as well as increases the dangerousness of the work. Further, when fruits are plucked by a plucker on the ground, the fruits picked with a pair of scissors are placed into a basket or the like one by one by one hand, again lowering the efficiency of the plucking work. Therefore, in fruit culture, the process of plucking fruits requires remarkably much time and labor.

SUMMARY OF THE INVENTION

It is, therefore, an important object of the present invention to provide a fruit plucking device with which fruit can be plucked by using only one hand.

Another important object of the present invention is to provide a fruit plucking device capable of high working efficiency and which allows fruit to be plucked with a minumim of labor.

A further important object of the present invention is to provide a fruit plucking device which can sefely pluck fruits on a tall tree.

A further important object of the present invention is to provide a fruit plucking device wherein the fruit cut by a pair of scissors can be securely received.

A further important object of the present invention is to provide a fruit plucking device which can pluck fruits on high trees.

BRIEF DESCRIPTION OF THE DRAWINGS

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE INVENTION

Figure 1:
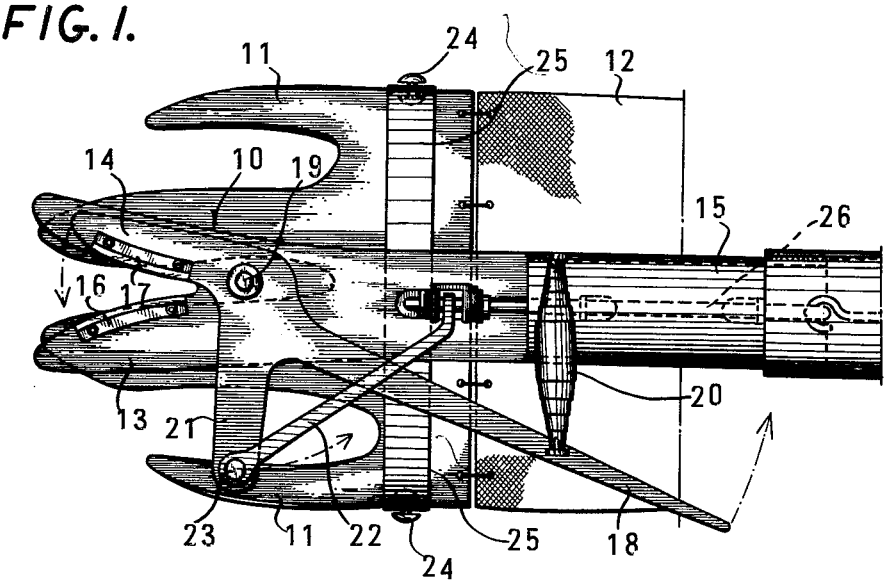
FIG. 1 is a side view of an embodiment of a fruit plucking device according to the present invention.
Figure 2:
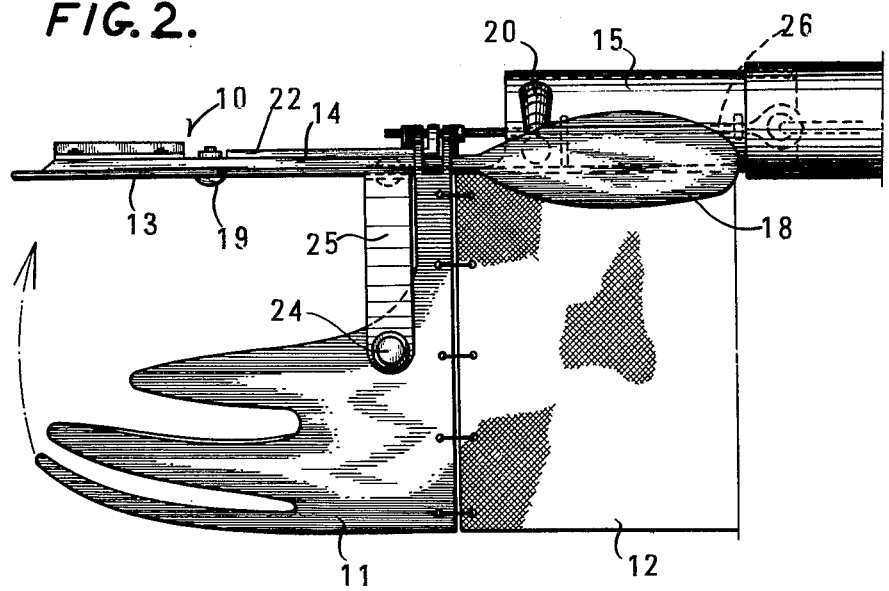
FIG. 2 is a plan view of the fruit plucking device shown in FIG. 1.
Figure 3:
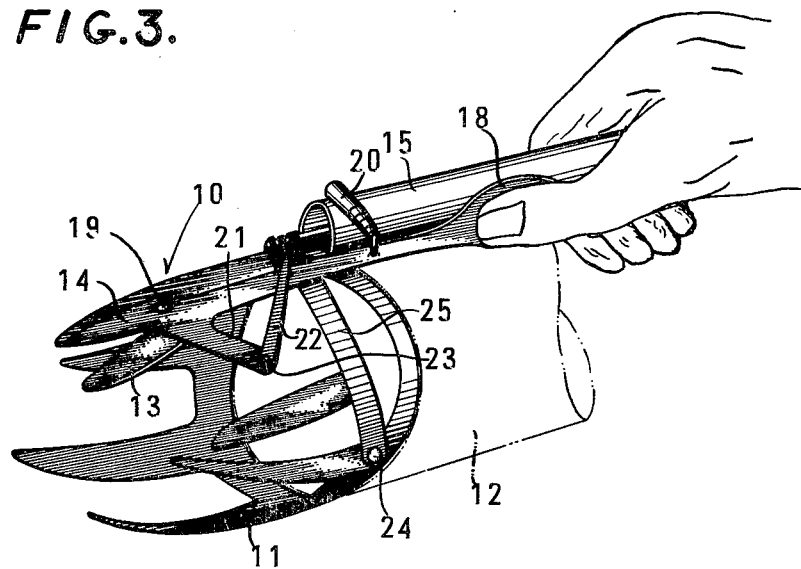
FIG. 3 is a perspective view of the fruit plucking device shown in FIG. 1.

A fruit plucking device shown in FIGS. 1 to 3 comprises a pair of scissors 10, a holding means 11 and a conveying means 12.

The pair of scissors 10 comprises a stationary member 13 and a movable crimping member 14. The stationary member 13 has a cylindrical handle connected at the rear end thereof. The leading end of the stationary member 13 has a V-shaped cutaway portion and one side of the member 13 adjacent to the cutaway portion (the lower side seen in FIG. 1) is provided with a cutting edge 16. The V-shaped cutaway portion provided at the top portion of the stationary member 13 facilitates the introduction of a branch of a fruit tree or the stem of a piece of fruit thereinto. When the movable member 14 is in an inoperative position with respect to the stationary member 13, the cutting edges of both the stationary member 13 and movable member 14 are disposed to define therebetween a substantially V-shaped opening; the cylindrical handle 15 is connected to the top of the stationary member 13 as shown in FIG. 2, so that cut fruit can be more smoothly conveyed through the cylindrical conveying means thereunderneath. The width of the stationary member 13, especially the width of the top thereof, is preferably such that a stem of a piece of fruit may be easily guided into the V-shaped cutaway portion and at the same time the stationary member 13 can smoothly reach a desired stem. Preferred example of the width is 2 or 3 cm.

On one side of the top portion of the movable member 14 is a longitudinally elongated cutting edge 17; at the rear portion of the member 14 is a lever 18 that can be moved by fingers. The movable member 14 is pivoted at a point a little ahead of its central portion to the stationary member 13 by means of a pin 19, so that by pushing the lever 18 with the fingers, the cutting edge 17 contacts and coacts with the cutting edge 16 of the stationary member 13 and slides to nip and cut the stem holding a fruit.

Both the stationary and movable member have the cutting edges an the top edge portions thereof. If the scissors are metal, the cutting edges may be obtained by grinding the scissor members themselves. However, by fixing separate cutting edges to the scissors shown in FIG. 1, the scissors cut better. Further, when the scissor members are synthetic resin, separate cutting edges must be fixed to each of the stationary and movable members.

Between the stationary and movable members, a compression spring 20 is fixed with the ends thereof connected to the two members respectively at a position behind the pin 19. By means of the compression spring 20, the cutting edge 17 of the movable member 14 is continuously held in the inoperative position, so that a fruit stem can always be inserted between the cutting edges of the stationary and movable members 13, 14. Because of this compression spring 20 it is not necessary to move the movable member 14 into the open position. This facilitates the use of the device, especially when the device is remotely controlled by pulling the movable member 14 by means of a separate pull member. Any spring may be used to open the movable member as long as it is strong enough to keep the members apart.

From the movable member 14, an arm 21 extends transversely. To the top surface of the outer end of this arm 21, one end of a connecting rod 22 is connected by means of a pin 23. The other end of the connecting rod 22 is pivotally connected to the upper portion of the rear end of the holding means 11 around a pull member 26 between two ear members of the holding means for the holding means 11.

The holding means 11 is adapted to guide the fruit cut with the scissors from the branch to the conveying means 12. Therefore, the holding means 11 is fitted to the lower portion of the scissors 10 for enclosing the fruit during the cutting operation to prevent the cut fruit from falling to the ground.

The holding means 11 is preferably light in weight. Therefore, it is preferably formed into a grid-like shape with each space preventing the fruit from falling down, as shown in FIGS. 1 to 3. At the front and rear ends of the holding means 11, there is an open area of a diameter sufficient to permit fruit to pass therethrough. The fruit is guided through the front open area into the holding means 11 when it is cut down, and after being cut down, it is guided through the rear opening into the conveying means 12. Therefore, the inner diameter of the holding means is selected in accordance with the size of the fruit to be cut down, and preferably, should be sufficient to permit the fruit to pass smoothly therethrough. Consequently, the inner diameter of the holding means is a little larger than the outer diameter of the fruit usually by about 5 to 15 cm. Further, the front portion of the holding means 11 is slightly converged (bent upward and inward) to prevent the fruit cut down from falling out therethrough.

The holding means 11 is connected to a holding arm 25 on both sides of the rear portion thereof by means of pins 24. The holding arm 25 extends downwardly from the stationary member 13 in a semi-circular shape, and both ends thereof are pivotally connected to the centers of both sides of the holding means 11. The connecting rod 22 is also connected to the upper portion of the rear end of the holding means 11, (the other end being connected to the top end of the arm 21 of the movable member 14). The arm 21 of the movable member 14 extends transversely from the member 14 and the lever 18 at the rear end thereof. By pushing the lever 18 the arm 21 pushes the connection rod 22, and in turn the connecting rod 22 pushes the front end of the holding means 11, whereby the front end of the holding means 11 is closed or raised to make the opening have a smaller diameter. Thus, when a fruit is plucked by squeezing the lever 18 with the fingers, the front portion of the holding means 11 is closed or raised and the opening narrowed. Such a structure allows the plucked fruit to be effectively prevented from falling from the holding means 11, and with this structure, fruit can be plucked with the front portion of the holding means 11 below the rear portion thereof. For this purpose, however, it is necessary that the front portion of the holding means 11 be narrowed when a fruit is plucked, and therefore, the front portion of the holding means 11 is preferable narrowed before the fruit is plucked. This can be realized by making a larger angle between the cutting edges of the stationary and movable members 13, 14, or by providing cutting edges on only the top surfaces of the stationary and movable members 13, 14. If the angle between the cutting edges of the stationary and movable members 13, 14, or more correctly, the angle formed when the lever is unpulled is large, by pulling the lever 18 a little, the front opening of the holding means 11 begins to narrow before the stem carrying the fruit is cut. Further pushing of the lever with more strength cause the stem of the fruit to be cut by the cutting edges for the first time. At this stage, the front opening of the holding means 11 is further narrowed. As the alternative, if cutting edges are provided only on the top surface of the stationary and movable members 13, 14, by pushing the lever 18 only a little, the stem is not plucked between the cutting edges. However, further pushing of the lever 18 with more strength gradually brings the stem toward the top portion and at least the stem is plucked between the cutting edges. At this stage, since the lever has been strongly pushed, the front opening of the holding means is narrowed to prevent the fruit from falling forward.

The holding means 11 is fitted to the supporting arm 25 at the upper and lower centers on both sides thereof. This is because when the holding means 11 is fitted at the upper position, the top end of the means 11 is narrowed more by the same strength of pulling of the lever 18, while when the holding means 11 is fitted at the lower position, the top end of the means 11 is narrowed less but the lever becomes lighter. The most preferred fitting positions, which provide relatively light operation of the lever 18 and at the same time prevent the fruit from falling out, are the upper and lower centers on both sides of the holding member 11.

Figure 4:
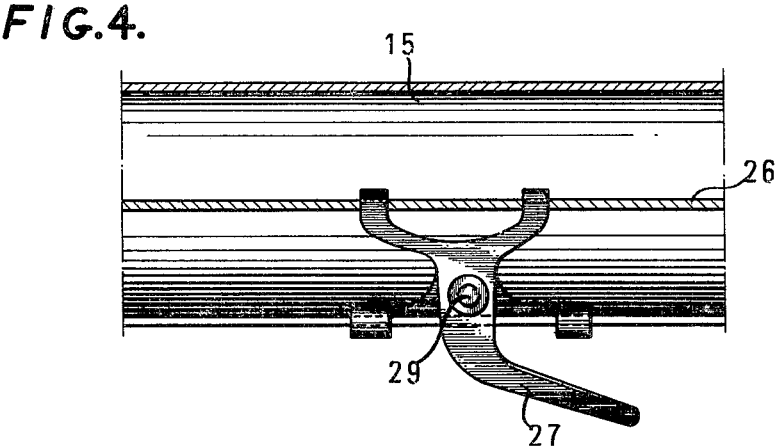
FIG. 4 is a side view illustrating a handle to which a pull lever is attached.

Connected to the upper portion of the rear end of the holding means 11 is one end of a pull member 26 which is longitudinally connected along the handle 15 of the stationary member 13. By pulling the pull member 26, the holding means is pivoted and at the same time the movable member 14 is operated by means of the connecting rod 22 and the arm 21, whereby a branch is cut by the movable member 14. With this structure, fruit can be plucked not by pushing the lever 18 with the fingers, but by pulling the pull member 26. Therefore, by elongating the handle 15, fruit on tall trees can also be plucked by a person on the ground. When the handle 15 is formed as a hollowed cylindrical shape, it is light, tough and especially strong against bending, as well as conveniently permitting the pull member 26 to be passed therethrough. If the movable member 14 is adapted to be forced to open by means of the spring, it is not necessary for the pull member 26 to push the holding means, all that is required is a pull on the same. Therefore, a cord-like article such as a rope, wire or the like can be used as the pull member 26. In order to pull the pull member 26 with less strength, a pull lever 27 is pivoted toward the handle 15 as shown in FIG. 4 when the pull member 26 is connected to the pull lever 27. The pull lever 27 is adapted to pull the pull member 26 by hand-gripping the lever 27. A rotation shaft 29 thereof is pivotally connected in a direction perpendicular to the axis of the handle 15 and in such a manner as passing through a cutaway portion of the handle 15 from inside to outside of the handle 15.

The front peripheral edge of the conveying means 12 is connected to the rear end of the holding means 11 with a string or the like and is adapted to temporarily store the fruit fed from the holding means 11 or convey the fruit to a separate container. The conveying means 12 is preferably formed from soft and flexible material such as cloth, plastic sheeting or the like. Further, in most cases, fruit is taken from the rear end of the conveying means 12, the means 12 being so formed as open at the rear end; however, fruit is not necessarily taken from the rear, but may be stored in the conveying means 12 and then removed through the top opening of the holding means. The rear end of the conveying means may therefore, be closed, when it is more desirable to store more fruit in the conveying means 12 and then take it all out together at one time (rather then remove one fruit every time it is fed into the conveying means). It is not, however, necessary for the conveying means 12 to be very long. Most preferably, the length is 20 to 50 cm. A conveying means having such a length is held at the rear end with a hook 29 for fingers. Through the hook 29, the fingers of the hand carrying the fruit plucking device are inserted. Then, after some fruit is stored, the plucking device is handed down to the other hand, and by pulling the rear end of the conveying means 12 through the hook 29 to straighten the means 12, the fruit falls down and out of the conveying means 12.

A fruit plucking device with such a small length of conveying means 12 can be used as desired even among complicated branches. Further, by elongating the conveying means, for example, more than a few meters long and communicating the same at the rear end thereof to a container, fruits plucked by the scissors are conveyed through the conveying means into the container.

Experiments have shown the present invention to be quite efficient. The inventor has compared the amount of fruit plucked using a pair of conventional scissors and a fruit plucking device according to the present invention.

Although the invention has been described in its preferred form with a certain degree of particularity, it is understood that the present disclosure of the preferred form may be changed in the details of construction and the combination and arrangement of parts without departing from the spirit and the scope of the invention as hereinafter claimed.

I claim:

1. A fruit plucking device for cutting fruit from trees comprising:
   scissor means for cutting the stems of said fruit, said scissor means comprised of:
      a stationary member having a front portion with cutting edge of one side thereof,
      a handle member connected to the rear portion of said stationary member, and
      a movable crimping member pivotally connected to said stationary member, said movable member having: a front portion with a cutting edge on one side thereof adjacent the cutting edge of said front portion of said stationary member and contactable therewith, and a lever portion at the rear end of said front portion on the opposite side of the pivot point from said front portion;
   holding means pivotally connected to and extending beneath said scissor means and operatively connected to said movable member for pivoting upward when said movable member is pushed and for catching and holding therein the fruit cut by said scissor means, said holding means having front and rear openings larger in diameter than the diameter of said fruit being picked; and
   conveying means connected to the rear of said holding means and communicating with said rear opening of said holding means for conveying the cut fruit away from said holding means.

2. A device as claimed in claim 1 wherein said scissor means is further comprised of a compression spring means between the lever portion of said movable member and said stationary member for continuously forcing said front portions of said stationary and movable members apart.

3. A device as claimed in claim 1 wherein said front portion of said stationary member is V-shaped and said cutting edge is positioned on the inside edge of one side of said V-shape.

4. A device as claimed in claim 1
   wherein said movable crimping member further has an arm portion extending substantially transversely from said front portion and said lever portion; and
   further comprising a connecting rod pivotally connected at one end to the free end of said arm portion, and pull member means connected to the end of said connecting rod opposite the end connected to said arm portion and extending along said handle member for moving said movable member toward said stationary member through said connecting rod when said pull member is pulled.

5. A device as claimed in claim 4 wherein said handle member is hollow and said pull member means extends longitudinally therethrough.

6. A device as claimed in claim 5 wherein said pull member means is comprised of a cord-like element extending through said handle member.

7. A device as claimed in claim 5 wherein said pull member means is comprised of:
   a pull lever pivotally connected to said handle; and
   a cord-like member passing through said handle and connected to said pull lever.

8. A device as claimed in claim 4 wherein:
   said scissor means is further comprised of a downwardly projecting arc-shaped holding arm extending downward from said stationary member; and
   said holding means is pivotally connected at the sides thereof to the ends of said arc-shaped holding arm and is further connected at the top thereof to said pull member means adjacent said connecting rod.

9. A device as claimed in claim 1 wherein said holding means is comprised of a plurality of tine-like members bent and inclined upward toward said front opening thereof.

10. A device as claimed in claim 1 wherein said conveying means is a bag-like member comprised of a soft-flexible material open at one end and connected at said open end to said rear opening of said holding means.

11. A device as claimed in claim 10 wherein said flexible material is selected from the group consisting of cloth and plastic sheeting.

12. A device as claimed in claim 10 wherein said bag-like member is open at the end thereof opposite the end connected to said holding means.

13. A device as claimed in claim 1 wherein said conveying means has a length of 20–50 cm.

* * * * *